(12) United States Patent
Oda

(10) Patent No.: US 9,290,334 B2
(45) Date of Patent: Mar. 22, 2016

(54) WORKING SYSTEM PROVIDED WITH SERVO-CONTROLLED AUTOMATIC OPERATING DOOR

(71) Applicant: FANUC CORPORATION, Yamanashi (JP)

(72) Inventor: Masaru Oda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 71 days.

(21) Appl. No.: 14/220,619

(22) Filed: Mar. 20, 2014

(65) Prior Publication Data

US 2014/0286734 A1 Sep. 25, 2014

(30) Foreign Application Priority Data

Mar. 21, 2013 (JP) .................................. 2013-058091
Jun. 11, 2013 (JP) .................................. 2013-122346

(51) Int. Cl.
| | | |
|---|---|---|
| G05B 19/04 | (2006.01) | |
| B65G 47/74 | (2006.01) | |
| B25J 9/16 | (2006.01) | |
| B23Q 7/04 | (2006.01) | |
| B23Q 11/08 | (2006.01) | |

(52) U.S. Cl.
CPC *B65G 47/74* (2013.01); *B23Q 7/04* (2013.01); *B23Q 11/0891* (2013.01); *B25J 9/16* (2013.01); *Y10T 483/16* (2015.01); *Y10T 483/17* (2015.01)

(58) Field of Classification Search
USPC ..................................... 414/222; 483/14, 16
See application file for complete search history.

(56) References Cited

U.S. PATENT DOCUMENTS

| | | | |
|---|---|---|---|
| 2005/0269382 A1* | 12/2005 | Caputo et al. ................... 228/43 |
| 2008/0006306 A1* | 1/2008 | Leyendecker et al. .......... 134/61 |
| 2008/0275593 A1* | 11/2008 | Johansson ..................... 700/245 |
| 2010/0127158 A1* | 5/2010 | Scheiber et al. ........... 250/208.1 |
| 2012/0005748 A1* | 1/2012 | Zondler et al. .................. 726/21 |

FOREIGN PATENT DOCUMENTS

| | | |
|---|---|---|
| CN | 101637875 A | 2/2010 |
| CN | 101716731 A | 6/2010 |
| CN | 201889558 U | 7/2011 |
| EP | 1623773 A1 | 2/2006 |
| JP | S614641 A | 1/1986 |
| JP | H10180589 A | 7/1998 |
| JP | 2000-141159 A | 5/2000 |
| JP | 2006075916 A | 3/2006 |
| JP | 2008-207270 A | 9/2008 |
| JP | 2010228063 A | 10/2010 |

OTHER PUBLICATIONS

English Translation of Abstract for Chinese Publication No. 201889558 published Jul. 6, 2011, 1 page.

(Continued)

*Primary Examiner* — Bhavesh V Amin
(74) *Attorney, Agent, or Firm* — Fredrikson & Byron, P.A.

(57) ABSTRACT

A working system including: a working machine having a door operated so as to be closed at a time of working and be opened at a time of non-working; an automatic changer provided so as to enter and exit from an inside of the working machine through the door to change a worked object and/or a tool; and an actuator operating the door. The actuator is a servo motor dedicated to operating the door.

2 Claims, 8 Drawing Sheets

(56) References Cited

OTHER PUBLICATIONS

English Translation of Abstract for Chinese Publication No. 101716731, published Jun. 2, 2010, 1 page.
English Translation of Abstract for Chinese Publication No. 101637875, published Feb. 3, 2010, 1 page.
English Translation of Abstract for European Publication No. 1623773, published Feb. 8, 2006, 1 page.
English Translation of Abstract for Japanese Publication No. S614641, published Jan. 10, 1986, 1 page.

* cited by examiner

WORKING SYSTEM PROVIDED WITH SERVO-CONTROLLED AUTOMATIC OPERATING DOOR

BACKGROUND OF THE INVENTION

1. Field of the Invention

The present invention relates to a working system which is provided with a servo-controlled automatic operating door.

2. Description of the Related Art

In the past, a machine tool or other working machine has been provided with a door which is closed during working and is opened at the time of non-working (for example, at the time of changing workpieces). As an apparatus which operates this type of door so as to open and close by driving of an air cylinder, for example, the apparatuses which are described in Japanese Unexamined Utility Model Publication No. 5-74744 (JP5-74744U) and Japanese Unexamined Patent Publication No. 2008-207270 (JP2008-207270A) are known.

In the apparatuses which are described in JP5-74744U and JP2008-207270A, an air cylinder is driven to operate the door. For this reason, the operating speed of the door cannot be controlled. Therefore, in order to reduce impact at the time of operating the door, the operating speed has to be lowered.

SUMMARY OF THE INVENTION

A working system according to one aspect of the present invention includes a working machine having a door operated so as to be closed at a time of working and be opened at a time of non-working, an automatic changer provided so as to enter and exit from an inside of the working machine through the door to change a worked object and/or tool, and an actuator operating the door. Further, the actuator is a servo motor dedicated to operating the door.

BRIEF DESCRIPTION OF THE DRAWINGS

The objects, features, and advantages of the present invention will become clearer from the following description of embodiments in relation to the attached drawings, in which.

DETAILED DESCRIPTION

First Embodiment

Figure 1:
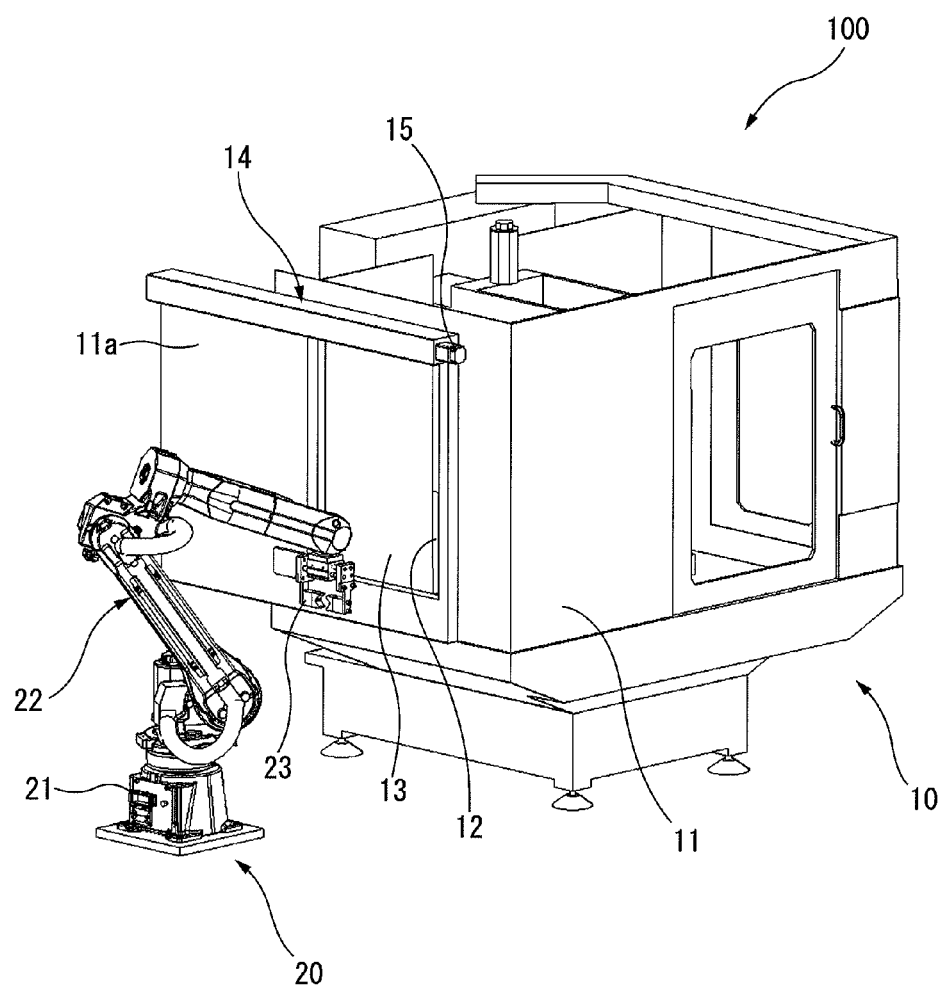
FIG. 1 is a view which shows the configuration of a working system according to an embodiment of the present invention.
Figure 2:
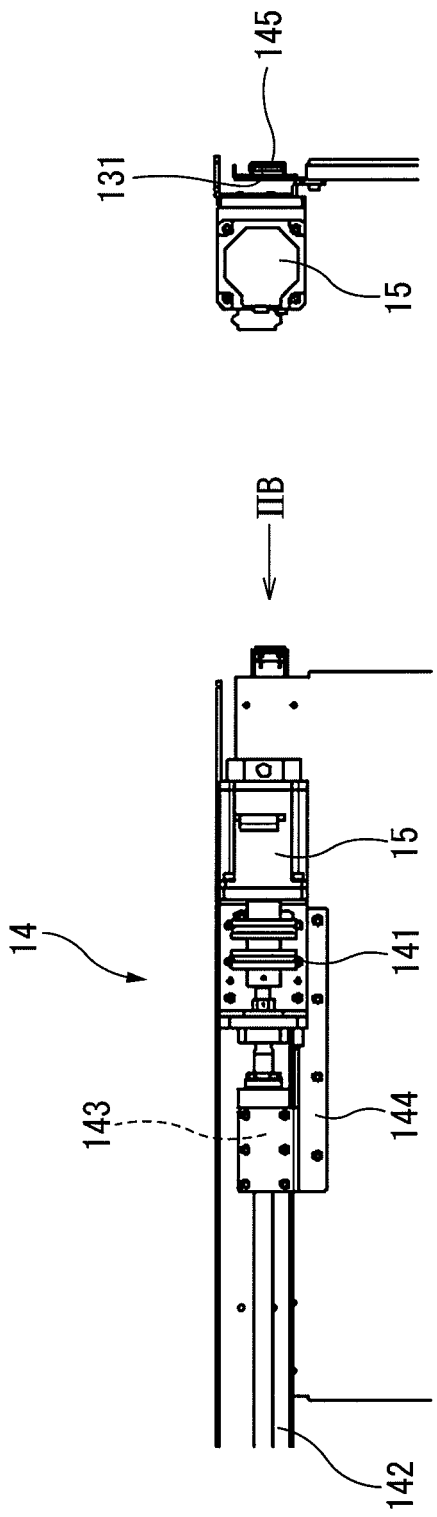
FIG. 2A is a front view which shows an operating mechanism of the door of FIG. 1.
FIG. 2B is a view along an arrow IIB of FIG. 2A.

Below, referring to FIG. 1 to FIG. 5, a first embodiment of the present invention will be explained. FIG. 1 is a view which shows the configuration of a working system 100 according to an embodiment of the present invention. This working system 100 is provided with a working machine 10 and an industrial robot 20 which is arranged adjoining the working machine 10.

The working machine 10 is, for example, a machine tool which works a workpiece and is surrounded in its entirety by a cover 11 so that machining fluid, etc. does not fly out to the outside during a working operation. At the surface of the cover 11 which faces the robot 20 (opening/closing surface 11a), a substantially rectangular opening part 12 is provided. A substantially rectangular shaped door 13 is attached slidably along the opening/closing surface 11a so as to close the opening part 12. The door 13 is opened and closed through an operating mechanism 14 by driving of a servo motor 15. Below, the servo motor 15 will sometimes be referred to as a "door operating motor". The servo motor 15 is, for example, fixed to an end part of the cover 11 at the outside of the opening part 12 (near a corner part of the top end side).

FIG. 2A is a front view which shows the operating mechanism 14 of the door 13, while FIG. 2B is a view along an arrow IIB of FIG. 2A. As shown in FIG. 2A and FIG. 2B, the operating mechanism 14 has a ball screw 142 which extends in a horizontal direction (operating direction of door 13) and is supported rotatably at the cover 11. The ball screw 142 is coupled through a coupling 141 to an output shaft of the door operating motor 15. A nut 143 is screwed onto the ball screw 142. The door 13 is integrally fastened to the nut 143 through a bracket 144. The cover 11 is provided with a guide part 145 which restricts a movement direction of the door 13. If the operation of the door operating motor 15 causes the ball screw 142 to rotate, the nut 143 moves along the ball screw 142, whereby part of the door 13, i.e., a moving part 131, slides along the guide part 145 in the horizontal direction. As a result, the door 13 opens and closes the opening part 12 shown in FIG. 1 at a speed according to the operation of the door operating motor 15.

The robot 20 shown in FIG. 1 is, for example, a vertical multiarticulated type robot and has a base 21 which is fixed to the floor, a robot arm 22 which is coupled with the base 21 to be able to turn, and a hand 23 which is provided at a front end part of the robot arm 22. The hand 23 of the robot 20 grips a workpiece or tool and enters or exits from the inside of the working machine 10 through the opening part 12. Due to this, the worked object, i.e., the workpiece, or the tool, etc. which is attached to the working machine 10 can be automatically changed. In other words, the robot 20 functions as an automatic changer which changes the workpiece or tool.

The door 13 is opened when the robot 20 (hand 23) enters the inside of the working machine 10 and is closed when the workpiece is worked after the robot 20 exits from the working machine 10. Therefore, the opening/closing operation of the door 13 and the entering/exiting operation of the robot 20 have to be carried out interlinked.

Figure 3:
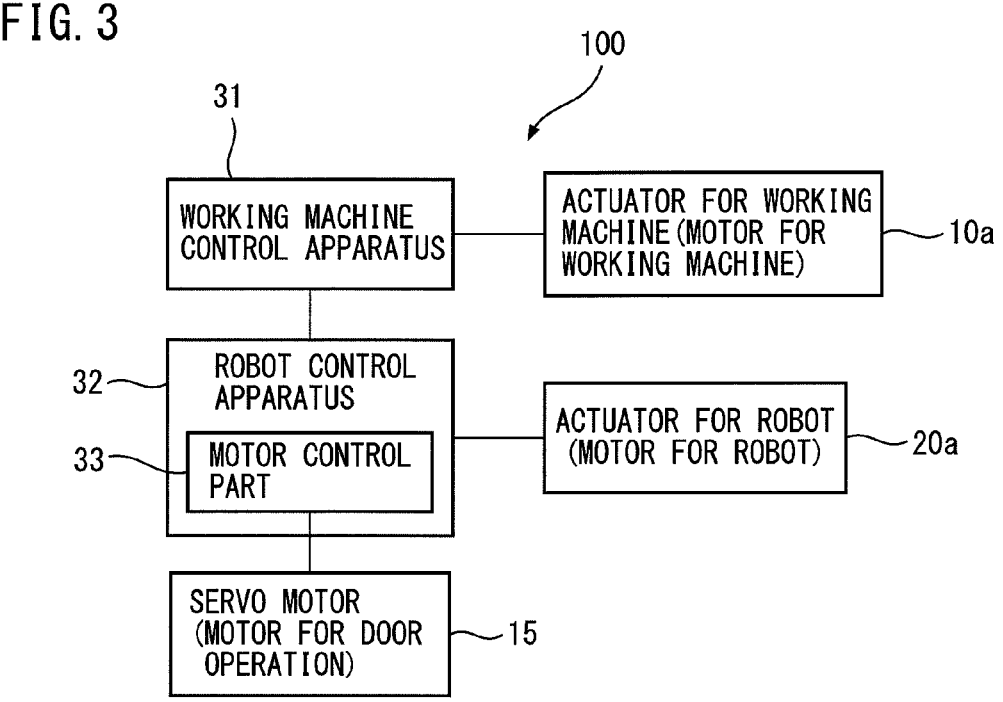
FIG. 3 is a block diagram which shows a control configuration of a working system according to a first embodiment of the present invention.

FIG. 3 is a block diagram which shows a control configuration of the working system 100 according to the first embodiment of the present invention. As shown in FIG. 3, the working system 100 has a working machine control apparatus 31 which outputs control signals to various actuators 10a excluding the door operating motor 15 which are provided at the working machine 10 so as to control the working machine 10 and a robot control apparatus 32 which outputs control signals to various actuators 20a which are provided at the robot 20 so as to control the robot 20. The actuators 10a are configured to include, for example, a servo motor (working machine motor), while the actuators 20a are also configured to include, for example, a servo motor (robot motor).

The working machine control apparatus 31 is configured by a processing system which has a CPU, ROM, RAM, and other peripheral circuits, etc., and a servo amplifier. The robot control apparatus 32 is also configured by a processing system which has a CPU, ROM, RAM, and other peripheral circuits, etc., and a servo amplifier. The robot control apparatus 32 further has a motor control part 33 which controls the door operating motor 15.

The motor control part 33 outputs a door opening signal or door closing signal to the door operating motor 15. Due to this, the door operating motor 15 is driven and the door 13 is opened or closed through the operating mechanism 14. In this case, the door 13 is opened and closed by the drive operation of the servo motor 15, so the speed of movement of the door 13 can be easily adjusted. For example, when the door 13 approaches the open position and closed position in the state of operating the door 13 at a high speed, the speed of movement of the door 13 is slowed. Due to this, it is possible to reduce the shock when stopping movement of the door 13 while operating the door 13 to open and close in a short time.

The robot control apparatus 32 can use the signal from a rotation detector which is built into the door operating motor 15 so as to obtain a grasp of the operating position of the door 13. It is also possible to use another detector to detect the operating position of the door 13 and have the signal from this detector be read by the robot control apparatus 32 so as to obtain a grasp of the operating position of the door 13. The robot control apparatus 32 outputs a control signal to a robot actuator (robot motor) 20a in accordance with the operating position of the door 13 and controls operation of the robot 20. For example, it makes the robot 20 enter the inside of the working machine 10 right after the door 13 reaches the open position.

The robot control apparatus 32 can, for example, use a signal from a rotation detector which is built into the robot motor 20a so as to obtain a grasp of the position and posture of the robot 20. It is also possible to use another detector to detect the position and posture of the robot 20 and have the signal from this detector be read by the robot control apparatus 32 so as to obtain a grasp of the position and posture of the robot 20. The robot control apparatus 32 (motor control part 33) outputs a control signal to the door operating motor 15 in accordance with the position and posture of the robot 20. For example, it makes the door 13 move from the open position to the closed position right after the robot 20 retracts to the outside of the working machine 10.

By using the robot control apparatus 32 to control the operation of the door 13 in this way, it is possible to synchronously control the robot motor 20a and the door operating motor 15 in accordance with the position and posture of the robot 20 and the position of the door 13. Due to this, it is possible to make the robot 20 operate while operating the door 13 to open and close. For example, it is possible to start the entering operation into the working machine 10 of the robot 20 before the door 13 reaches the open position or to start the closing operation of the door 13 before the exiting operation of the robot 20 ends, and therefore possible to realize efficient working.

Further, in the present embodiment, as the automatic changer, a general-purpose robot 20 is used. Therefore, the operation of attaching/detaching a workpiece or tool can be realized by an inexpensive configuration.

Figure 4:
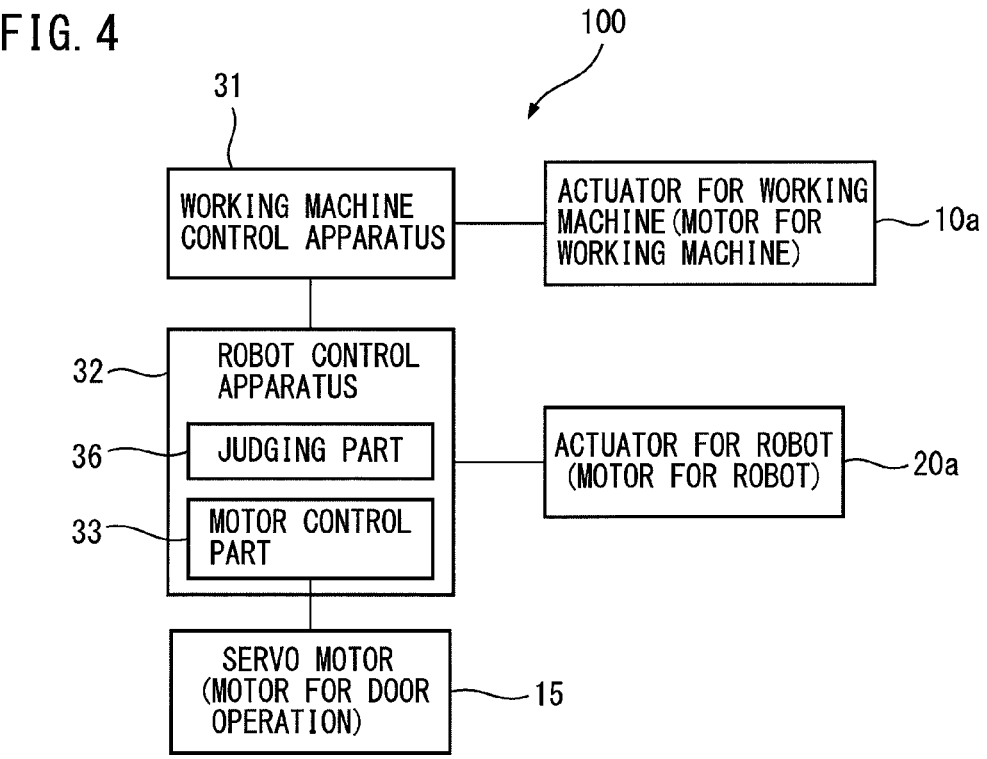
FIG. 4 is a block diagram which shows a modification of FIG. 3.

FIG. 4 is a block diagram which shows a modification of FIG. 3. FIG. 4 differs from FIG. 3 in the point that the robot control apparatus 32 has a judging part 36 in addition to the motor control part 33. The judging part 36 judges if an opening operation of the door 13 is necessary and if it is possible to make the robot 20 enter the inside of the working machine 10.

Figure 5:
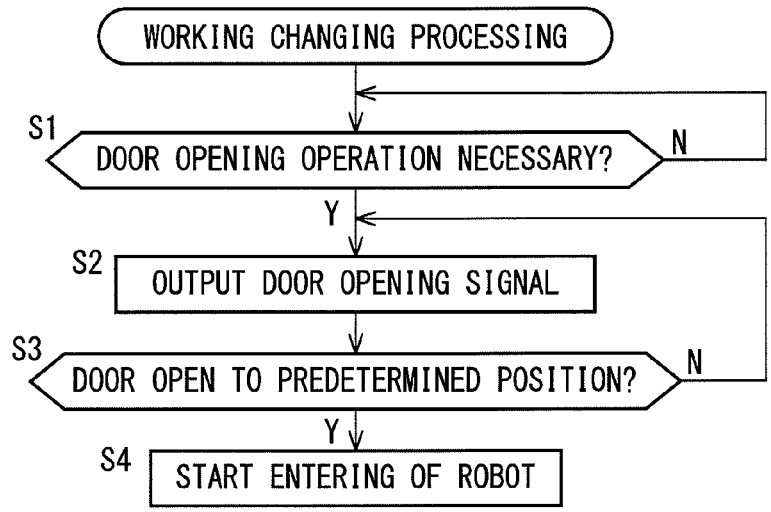
FIG. 5 is a flowchart which shows an example of processing in a robot control apparatus of FIG. 4.

FIG. 5 is a flowchart which shows one example of the processing which is executed in the robot control apparatus 32 of FIG. 4, in particular, one example of the workpiece changing processing which changes a workpiece at the inside of a working machine 10. At step S1, the judging part 36 judges if an opening operation of the door 13 is necessary. For example, if the work on the workpiece at the working machine 10 ends, the working machine control apparatus 31 outputs a working end signal to the robot control apparatus 32. If this working end signal is input at step 1, it judges that the opening operation is necessary. When the positive decision at step S1 is made, the routine proceeds to step S2.

At step S2, the motor control part 33 outputs a door opening signal to the door operating motor 15. Due to this, the door operating motor 15 is driven, whereby the door 13 starts an opening operation from the closed position toward the open position. At step S3, the judging part 36 judges if the door 13 has opened to a predetermined position, based on the position information from the door operating motor 15 (servo motor), i.e., information from a detector which detects the amount of rotation of the servo motor. Here, the "predetermined position" is the position at which the hand 23 of the robot 20 can enter the inside of the working machine 10 through the door 13 (robot enterable position) and is, for example, the wide open position at which the door 13 is fully opened. A position where the door 13 has opened by exactly a predetermined ratio with respect to the wide open position may also be made the "predetermined position". When the positive decision at step S3 is made, the routine proceeds to step S4, while when the negative decision is made, the routine returns to step S2. At step S4, a control signal is output to the robot motor 20a and makes the hand 23 of the robot 20 enter the inside of the working machine 10 through the door 13.

In this way, after it is judged that the door 13 has opened to the robot enterable position, the hand 23 of the robot 20 is made to enter the inside of the working machine 10, so the robot 20 can be made to operate with a good timing in accordance with the operating position of the door 13. Therefore, the work of changing the workpiece or tool can be carried out efficiently without the robot 20 and the door 13 interfering with each other.

Second Embodiment

Figure 6:
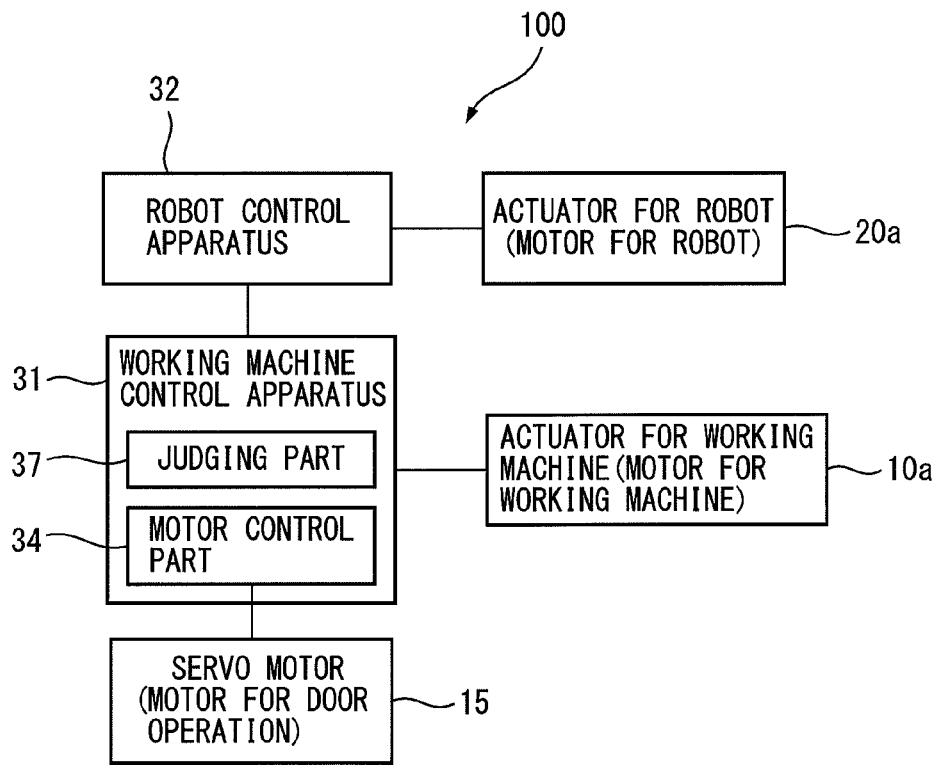
FIG. 6 is a block diagram which shows a control configuration of a working system according to a second embodiment of the present invention.
Figure 7:
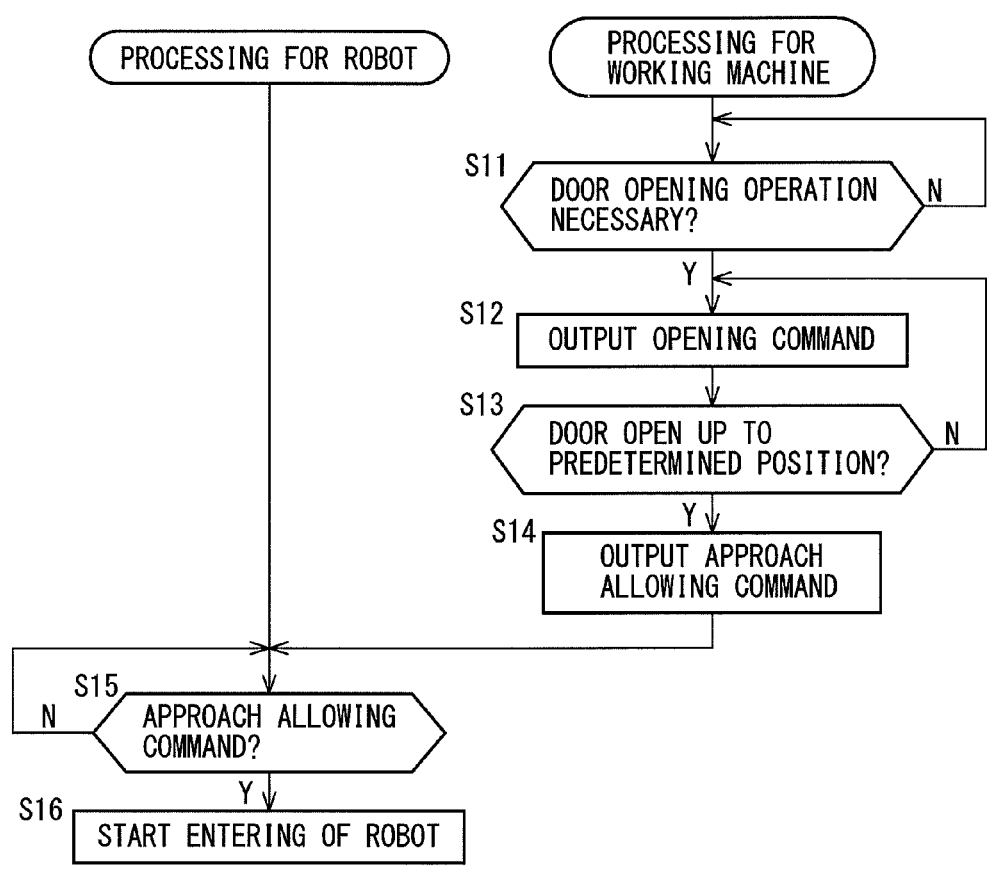
FIG. 7 is a flowchart which shows an example of processing in a working system of FIG. 6.

Referring to FIG. 6 and FIG. 7, a second embodiment of the present invention will be explained. The same portions as shown in FIG. 1 to FIG. 5 will be assigned the same reference notations. Below, the points of difference from the first embodiment will mainly be explained. In the first embodiment, although the robot control apparatus 32 controls the door operating motor 15, in the second embodiment, the working machine control apparatus 31 does this. FIG. 6 is a block diagram which shows one example of a control configuration of the working system 100 according to the second embodiment of the present invention. As shown in FIG. 6, the working machine control apparatus 31 has a motor control part 34 which controls the door operating motor 15 and a judging part 37 which judges if the robot 20 can be made to enter the inside of the working machine 10. The judging part 37 may also be provided at the robot control apparatus 32, or the judging part 37 may be omitted.

The working machine control apparatus 31 obtains a grasp of the position of the door 13 based on position information of the door operating motor 15 and obtains a grasp of the position and posture of the robot 20 based on signals from the robot control apparatus 32. On the other hand, the robot control apparatus 32 obtains a grasp of the position of the door 13 based on the signal from the working machine control apparatus 31. It is also possible to have a signal from a detector which detects the position and posture of the robot 20 be read by the working machine control apparatus 31 without going through the robot control apparatus 32 or possible to have a signal from a detector which detects the operating position of the door 13 be read by the robot control apparatus 32 without going through the working machine control apparatus 31.

The working machine control apparatus 31 outputs a control signal to the door operating motor 15 in accordance with the position and posture of the robot 20. Due to this, it is possible to optimally control the opening/closing operation of the door 13. Further, the robot control apparatus 32 outputs a control signal to the robot actuator 20a in accordance with the operating position of the door 13. Due to this, it is possible to optimally control the entering/exiting operation of the robot 20.

FIG. 7 is a flowchart which shows one example of the processing in the working system of FIG. 6, in particular one example of the processing for changing a workpiece. In FIG. 7, the processing at the working machine control apparatus 31 (processing for working machine) and the processing at the robot control apparatus 32 (processing for robot) are shown separated. First, as the processing for working machine, at step S11, the judging part 37 judges if an opening operation of the door 13 is necessary. For example, if machining the workpiece by the working machine 10 ends, it judges that an opening operation is necessary, then the routine proceeds to step S12.

At step S12, the motor control part 34 outputs an opening signal to the door operating motor 15 and starts the opening operation of the door 13. At step S13, the judging part 37 judges if the door 13 has been opened up to the robot enterable position based on the position information from the door operating motor 15. When the positive decision is made at step S13, the routine proceeds to step S14, while when the negative decision is made, the routine returns to step S12. At step S14, the working machine control apparatus 31 outputs to the robot control apparatus 32 a command which allows the robot 20 to entering the inside of the working machine 10 (approach allowing command).

Next, as processing for robot, at step S15, it is judged if the approach allowing command has been output from the working machine control apparatus 31. When the positive decision at step S15 is made, the routine proceeds to step S16 where a control signal is output to the robot motor 20a and the hand 23 of the robot 20 is made to enter the inside of the working machine 10 through the door 13.

In this way, in the second embodiment, the door operating motor 15 is controlled by the working machine control apparatus 31, so the door 13 can be made to operate to open/close in accordance with the working state, and the operating timing of the door 13 can be precisely controlled. Further, after the working machine control apparatus 31 (judging part 37) judges that the door 13 has opened to the robot enterable position, the robot control apparatus 32 makes the hand 23 of the robot 20 enter the inside of the working machine 10, so it is possible to efficiently change the workpiece or tool without the robot 20 and the door 13 interfering with each other.

Third Embodiment

Figure 8:
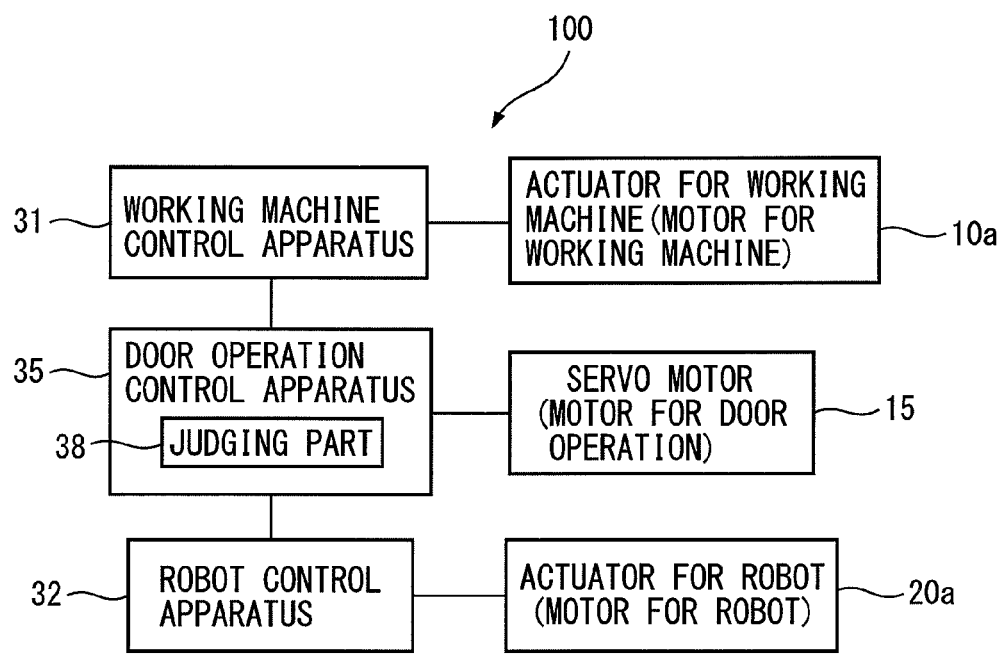
FIG. 8 is a block diagram which shows a control configuration of a working system according to a third embodiment of the present invention.
Figure 9:
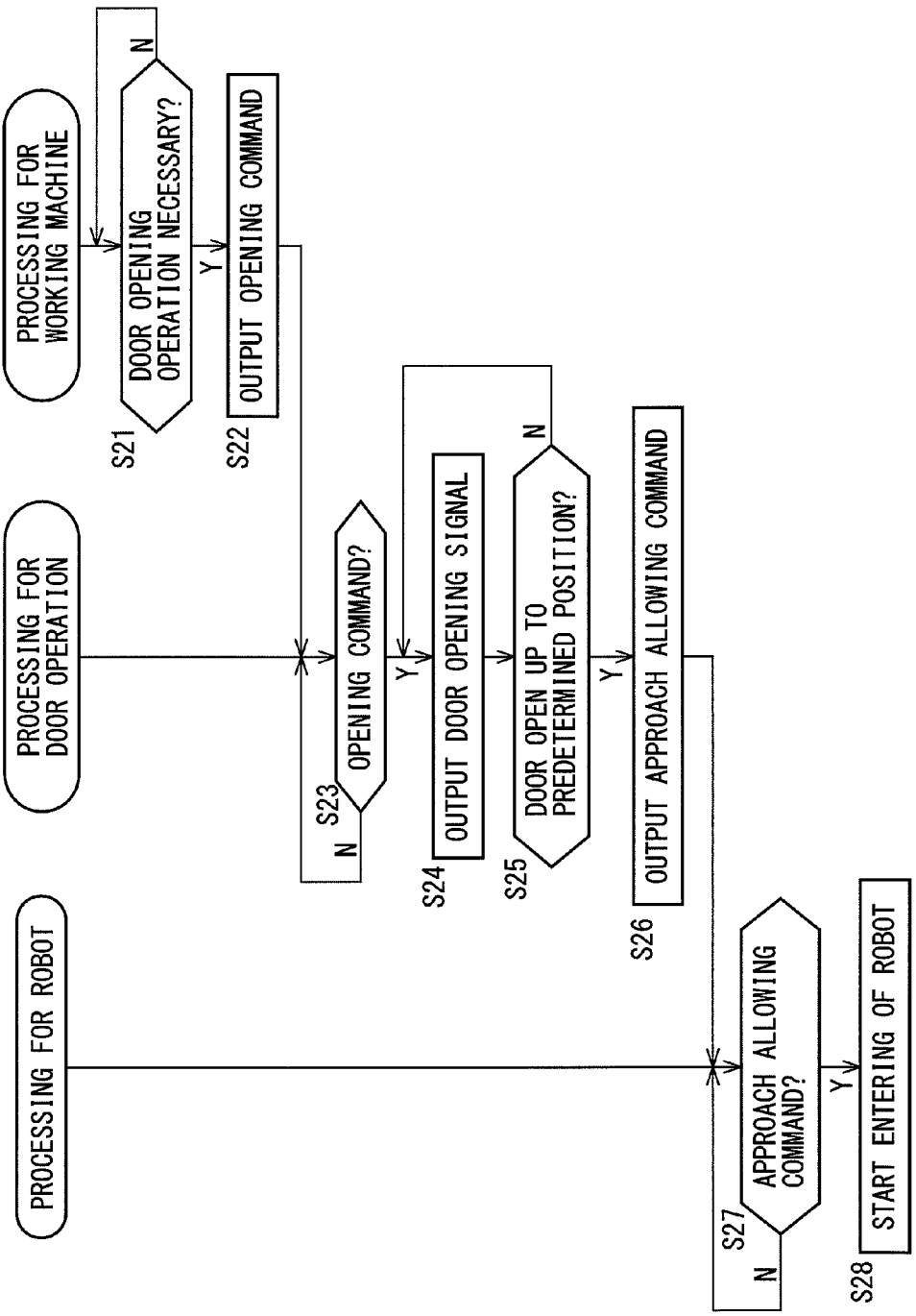
FIG. 9 is a flowchart which shows an example of processing in the working system of FIG. 8.

Referring to FIGS. 8 and 9, a third embodiment of the present invention will be explained. The same portions as shown in FIG. 1 to FIG. 5 will be assigned the same reference notations. Below, the points of difference from the first embodiment will mainly be explained. In the third embodiment, the control apparatus which controls the door operating motor 15 is provided separate from the working machine control apparatus 31 and robot control apparatus 32. FIG. 8 is a block diagram which shows one example of a control configuration of the working system 100 according to the third embodiment of the present invention. As shown in FIG. 8, the working machine system 100 has a working machine control apparatus 31, a robot control apparatus 32, and a door operation control apparatus 35. The door operation control apparatus 35 has a judging part 38 which judges if it is possible to make the robot 20 enter the inside of the working machine 10. The judging part 38 may also be provided at the working machine control apparatus 31 or robot control apparatus 32. Further, the judging part 38 may also be omitted.

The door operation control apparatus 35 obtains a grasp of the position and posture of the robot 20 based on the signal from the robot control apparatus 32, while the robot control apparatus 32 obtains a grasp of the operating position of the door 13 based on the signal from the door operation control apparatus 35. The door operation control apparatus 35 outputs a control signal to the door operating motor 15 in accordance with the position and posture of the robot 20. Due to this, it is possible to optimally control the opening/closing operation of the door 13. Further, the robot control apparatus 32 outputs a control signal to the robot actuator 20a in accordance with the operating position of the door 13. Due to this, it is possible to optimally control the entering/exiting operation of the robot 20.

FIG. 9 is a flowchart which shows one example of the processing in the working system of FIG. 8, in particular one example of the processing for changing a workpiece. The figure shows the processing at the working machine control apparatus 31 (processing for working machine), the processing at the robot control apparatus 32 (processing for robot), and the processing at the door operation control apparatus 35 (processing for door operation) separately. First, as the processing for working machine, at step S21, it is judged if an opening operation of the door 13 is necessary. For example, if machining the workpiece at the working machine 10 ends, it is judged if the opening operation is necessary, then the routine proceeds to step S22. At step S22, an opening command of the door 13 is output to the door operation control apparatus 35.

Next, as processing for door operation, at step S23, it is judged if an opening command has been output from the working machine control apparatus 31. When the positive decision is made at step S23, the routine proceeds to step S24 where an opening signal is output to the door operating motor 15 and the opening operation of the door 13 is started. At step S25, the judging part 38 judges if the door 13 has opened to the robot enterable position based on the position information from the door operating motor 15. When the positive decision is made at step S25, the routine proceeds to step S26 where while when the negative decision is made, the routine returns to step S24. At step S26, an approach allowing command is output to the robot control apparatus 32.

Next, as processing for robot, at step S27, it is judged if the approach allowing command has been output from the door operation control apparatus 35. When the positive decision is made at step S27, the routine proceeds to step S28 where a control signal is output to the robot motor 20a and the hand 23 of the robot 20 is made to enter the inside of the working machine 10 through the door 13.

In this way, in the third embodiment, a dedicated control apparatus 35 which is separate from the working machine control apparatus 31 and the robot control apparatus 32 is used to control the operation of the door 13, so the embodiment can be easily applied to existing working systems. Further, after the door operation control apparatus 35 (judging part 38) judges that the door 13 has been opened to the robot enterable position, the robot control apparatus 32 causes the hand 23 of the robot 20 to enter the inside of the working machine 10, so the work of changing the workpiece or tool can be efficiently carried out without the robot 20 and the door 13 interfering with each other.

Modifications

Figure 10:
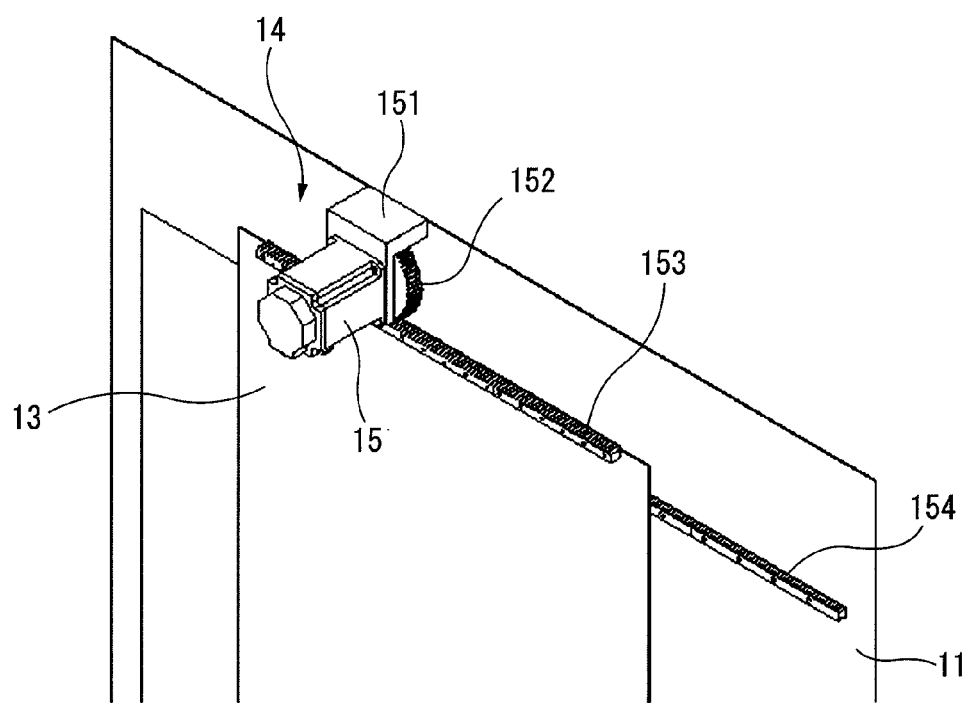
FIG. 10 is a view which shows a modification of FIG. 2.

In the above embodiments, the ball screw 142 and the nut 143, etc. configure the operating mechanism 14. However, the operating mechanism 14 is not limited to this configuration. FIG. 10 is a view which shows one example of the case of using a rack and pinion to configure the operating mechanism 14. In FIG. 10, the servo motor 15 for door operation is fastened through a fastening part 151 to an end part of the cover 11 (top end part), and the output shaft of the door operating motor 15 is coupled with a pinion 152 (pinion gear). At the top end part of the door 13, a rack 153 (rack gear) extends in the horizontal direction (operating direction of door 13). The rack 153 is engaged with the pinion 152. The cover 11 is provided with a guide part 154 which restricts the movement direction of the door 13. Due to this, if rotation of the door operating motor 15 causes the pinion 152 to rotate, the rack 153 moves in the horizontal direction. As a result, the door 13 is guided by the guide part 154 while moving in the horizontal direction and can open and close the opening part 12 at a speed according to the rotation of the door operating motor 15.

In the above embodiments (FIG. 2), the servo motor 15, ball screw 142, and guide part 145 are fastened to the cover 11. In the above modification (FIG. 10), the servo motor 15 and the guide part 154 are fastened to the cover 11. However, these may also be fastened to parts other than the cover 11 so long as being fastened to the main body of the working machine 10. If converting the rotary motion of the servo motor 15 to linear motion, the operating mechanism 14 may also be configured in a manner other than FIG. 2 and FIG. 10.

In the above embodiments, a machine tool is used as the working machine 10. However, the present invention may be similarly applied even to another working machine which has a door 13 which is closed at the time of working and is opened at the time of non-working. In the above embodiments, although the door 13 is attached slidably to the cover 11 of the machine tool, the door is not limited to this configuration. In the above embodiments, although the robot 20 is used as the automatic changer, the automatic changer may be configured by other than a robot as well so long as it is provided so as to enter and exit from the inside of the working machine 10 through the door 13 to change a worked object and/or a tool. Therefore, the automatic changing control apparatus which controls the automatic changer may also be configured by an apparatus other than a robot control apparatus 32.

The above embodiments may be combined with one or more of the above modifications.

According to the present invention, a door provided at a working machine is operated by driving of a servo motor, so it is possible to control the operating speed of the door and possible to complete the opening/closing operation within a short time.

Above, the present invention was explained in relation to preferred embodiments, but a person skilled in the art would understand that various corrections and changes may be made without departing from the scope of disclosure of the later set forth claims.

The invention claimed is:

1. A working system comprising:
   a working machine having a door operated so as to be closed at a time of working and be opened at a time of non-working;
   a working machine control apparatus controlling the working machine;
   a multi-articulated robot provided so as to enter and exit from an inside of the working machine through the door to change a worked object and/or a tool;
   a robot control apparatus controlling the multi-articulated robot; and
   an actuator operating the door,
   wherein the actuator is a servo motor dedicated to operating the door,
   the working machine control apparatus and the robot control apparatus are separately arranged and each controller includes an individual processing system which has a CPU,
   the CPU included in the processing system of the robot control apparatus performs a synchronous control for the servo motor dedicated to operating the door and a robot servo motor arranged in the multi-articulated robot, and
   the robot control apparatus having the CPU performing the synchronous control obtains an operating position of the door and a position and a posture of the multi-articulated robot, controls the robot servo motor in accordance with an obtained operating position of the door while controlling the servo motor dedicated to operating the door in accordance with an obtained position and posture of the multi-articulated robot, further comprising a detecting part to detect the operating position of the door, wherein
   the robot control apparatus controls the robot servo motor in accordance with the operating position of the door detected by the detecting part wherein the robot control apparatus has a judging part judging if the multi-articulated robot can enter the inside of the working machine based on a position information of the servo motor dedicated to operating the door which is detected by the detecting part and, makes the multi-articulated robot enter the inside of the working machine when the judging part judges that the multi-articulated robot can enter the inside of the working machine, wherein
   the working machine control apparatus outputs a working end signal to the robot control apparatus when the work on the workpiece at the working machine ends,
   the judging part judges if an opening operation of the door is necessary based on the working end signal,
   the robot control apparatus controls the servo motor dedicated to operating the door so as to start the opening operation of the door when the judging part judges that the opening operation of the door is necessary by receiving the working end signal.

2. The working system according to claim 1, further comprising an detecting part to detect the position and the posture of the robot, wherein
   the robot control apparatus controls the servo motor dedicated to operating the door in accordance with the position and the posture of the robot which is detected by the detecting part.

* * * * *